March 13, 1956 F. P. HEALY 2,737,760
MACHINE TOOL APPARATUS
Filed March 12, 1954 2 Sheets-Sheet 2
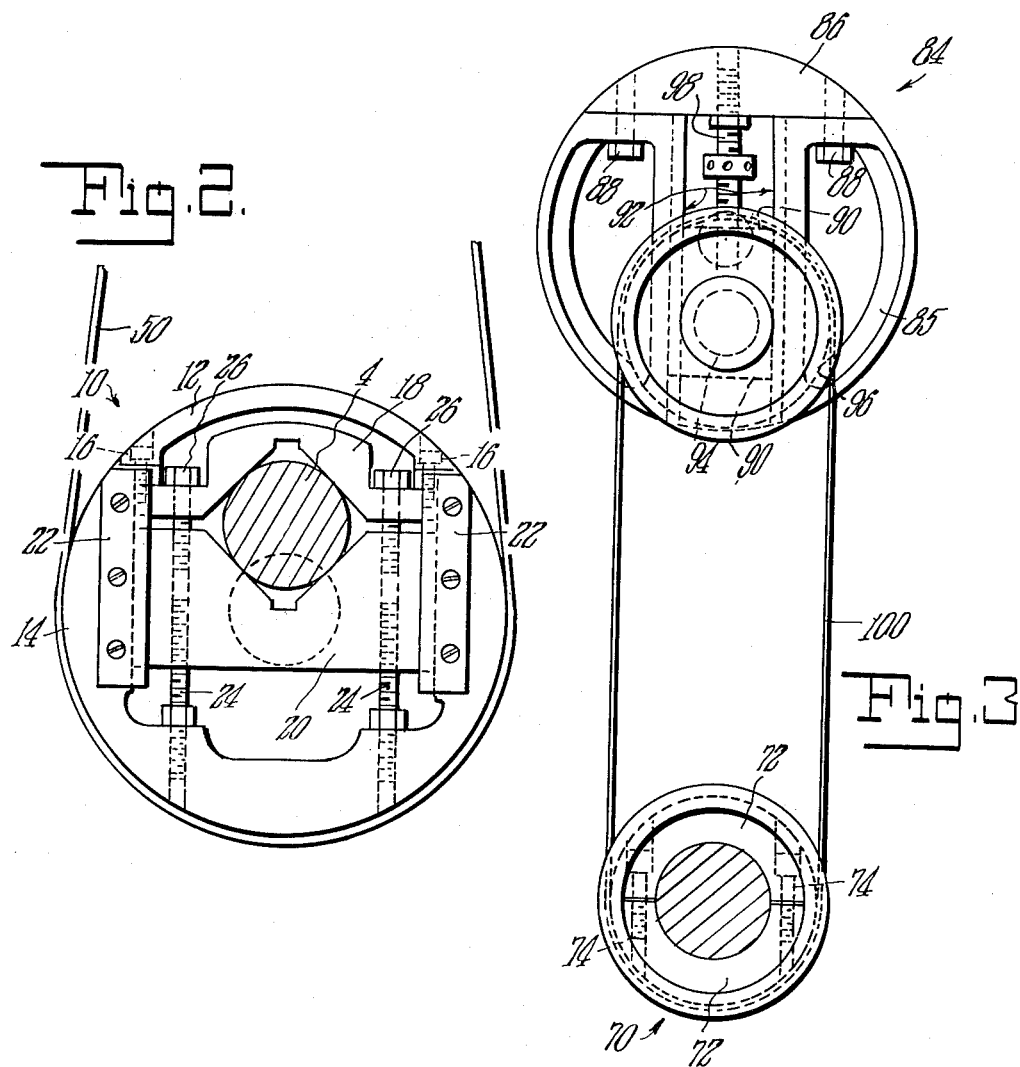
INVENTOR.
Francis P. Healy.
BY
Ross & Ross
Attys & Agnt.

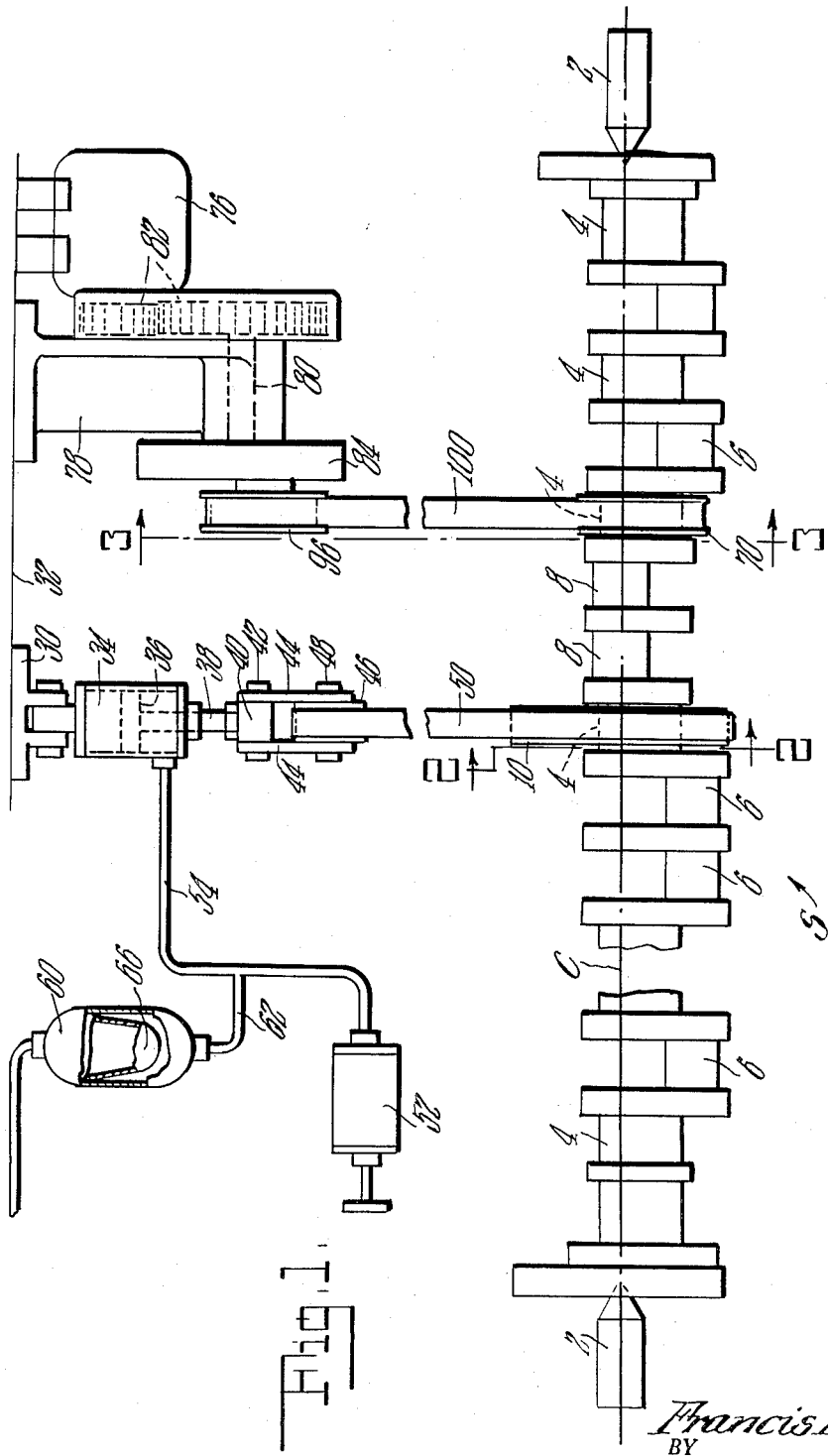

United States Patent Office 2,737,760
Patented Mar. 13, 1956

2,737,760

MACHINE TOOL APPARATUS

Francis P. Healy, Springfield, Mass., assignor to Van Norman Company, Springfield, Mass., a corporation Application March 12, 1954, Serial No. 415,896

4 Claims. (Cl. 51—236)

This invention relates to machine tool apparatus and is directed more particularly to improvements in apparatus for use in connection with machines for operating on the bearings of crank shafts.

The principal object of the invention is the provision of apparatus for supporting crank shafts in rotation thereof during grinding or other machining operations on a bearing or bearings thereof in such a manner as to eliminate downward deflection or sag in the shaft to insure rotation of the bearing or bearings being ground on their true axis of rotation.

Crank shafts in their manufacture require grinding and other operations on the bearings thereof and such shafts after use frequently require grinding or other machining operations of the bearings as steps in reconditioning said bearings. In grinding a throw or throws of a crank shaft, it is to be rotated on the longitudinal axis of the throw or throws to be ground in order that the bearing will be truly concentric with its axis.

As power equipment employing crank shafts such as diesel engines and the like have increased in power output, the crank shafts have increased in length with an increasing number of main and throw bearings until crank shafts have become many feet in length and are of great weight.

Where these long and heavy crank shafts are rotated on the axis of the bearings to be ground, such as the throws, downward deflections or sags in the shaft occur which tend to and do displace the throw or throws downwardly relative to the axis of rotation so that in the grinding operation the finished throw is not correctly related to the axis of rotation.

According to one feature of this invention, novel apparatus is constructed and arranged to support the shaft in such a way as to cancel such downward deflections and sag as there may be. In this way, the throw or aligned throws are held on an intended axis in coincidence with the axis of rotation of the throw or throws, whereby the ground throw or throws are then not only concentric relative to a common axis but are correctly located relative to the axis of the main bearings of the shaft.

More specifically according to the invention whilst the crank shaft is being rotated on the horizontal axis of the throw or throws being ground or machined, the downward deflection or sag is opposed and overcome by novel means constructed and arranged to exert a lifting force so as to elevate the shaft sufficiently to maintain the throw bearing or bearings being worked on on the true horizontal axis of rotation.

According to one feature of the invention, novel means is provided to eliminate deflection while the crank shaft is being rotated by suitable means. According to another feature, the shaft is rotated by means simultaneously exerting forces to eliminate deflection.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view more or less diagrammatic of apparatus to explain the novel features of the invention;

Fig. 2 is a front elevational view of a shaft engaging wheel shown in Fig. 1 and on line 2—2 of Fig. 1; and Fig. 3 is a front elevational view to explain another form of the invention and on line 3—3 of Fig. 1.

It will first be explained that where bearings of a crank shaft such as the throw bearings are to be ground or otherwise machined that the shaft is rotated on the longitudinal axis of the throw to be ground.

Various forms of machines may be employed for grinding and machining operations. For instance, there may be head and tail stocks at opposite ends of an elongated bed which may be provided with axially aligned centers. Jigs or fixtures and opposite ends of the crank shaft are associated in such a manner that the throw or axially aligned throws to be ground are rotatably supported by the machine on the axis of the centers.

A machine for grinding forms no part of the present invention and is not shown. Centers are represented by 2 and the crank shaft S is to rotate on the axis of aligned throws to be ground represented by the center line C shown.

The crank shaft S has main bearings 4 and throws such as 6 and 8 on axes offset from and at the sides of the main bearings. It will be assumed that the throws 8 are to be ground they being on the axis of rotation represented by the center line C. Crank shafts have various relative arrangements of main and throw bearings.

As has been stated, crank shafts are frequently of great length and are extremely heavy, say ten or more feet in length and weighing thirty-five hundred pounds and more wherefore due to length and weight there is considerable downward deflection or sag intermediate opposite ends of the shaft when supported at opposite ends for rotation.

A wheel or pulley 10 is secured to one of the main bearings 4. Said wheel is in two parts 12 and 14 which are secured together in some suitable manner as by bolts 16. Clamps 18 and 20 have opposite sides guided for sliding movements beneath plates 22. These clamps have angularly related edges, as shown, for engaging opposite sides of a main bearing 4 of the cam shaft.

Clamp bolts 24 in threaded engagement with the clamp 18 and clamp 20 and abutting the wheel part 14 move said clamp into engagement with the bearing 4. Other bolts 26 in threaded engagement with plate 20 draw clamp 18 to the clamp 20. By means of the bolts and clamps the main bearing is secured in the wheel.

The parts 18 and 20 are adjusted by screws 24 and 26 relative to the periphery of the wheel so that the axis of the wheel coincides with the axis of the throw and the axis of rotation thereof.

A bracket 30 fixed to a support 32 has a cylinder 34 secured thereto. A piston 36 is reciprocable in the cylinder and a rod 38 depending from the piston carries an end fitting 40 to which at 42 links 44 are pivoted. A wheel 46 between the links 44 is journalled therein at 48.

An endless band 50 passes around the wheels 10 and 46 and will be of flexible, non-stretchable and strong material. A suitable band may be flexible steel of which there are suitable types.

A pump 52 is connected to the cylinder 34 by piping 54 and the system will contain liquid, such as oil. The pump may be of any suitable form so that predetermined pressure may be applied to the piston 36.

It will be assumed that the shaft is rotated on the horizontal axis C for grinding throws 8. Sufficient pressure is established in the system so that through the wheels and band downward deflections will be eliminated. By deflections is meant sagging of the shaft due to its weight and not a permanent set or kink present in the shaft. The pressure established in the system will be such that upward forces lift the shaft to maintain the throws accurately on the axis of rotation. Accuracy may be determined by various means and methods.

Shafts having ninety thousandths of downward deflection have been known. The apparatus, however, is capable of removing a greater amount of deflection by applying force in opposition to the deflection.

An accumulator 60 includes a closed vessel connected by 62 at its lower end to piping 54. An upper connection 64 is connected to a source of air pressure and to a flexible container 66 within the vessel 60 but not in communication therewith. There will be liquid pressure outside of and air pressure within container 66.

Should there be a kink in the shaft which in rotation of the shaft arrives at top center the piston will tend to move upwardly so that pressure in the system will decrease slightly but is overcome by expansion of the flexible container which is under air pressure.

As stated, pressure in the system will be such as to cancel downward deflection of the shaft and locate the throws on the axis of rotation which location may be determined by various indicating and measuring means. With the shaft being rotated on the axis of certain aligned throws, a throw or throws may be ground or otherwise machined by any well known apparatus.

There may be plural mechanisms used in conjunction with plural main bearings of the crank shaft as the condition thereof may require in order to locate and maintain the throws on the axis of rotation.

The mechanism already described is used where the shaft is rotated, on the center line or axis of the throws by means provided therefor and usually associated with the machine where the grinding is performed.

That is to say, in one way the machine with which the apparatus is used will be provided with means for rotating the shaft on the axis of rotation. In another way, means to eliminate deflection will simultaneously rotate the shaft on the axis of the bearing or bearings to be ground and will now be described.

A wheel 70 has half parts 72 which are secured together by bolts 74 about a main bearing 4 of the crank shaft. A motor 76 secured to support 32 adjacent a bracket 78 which is secured to the support drives a shaft 80 journalled in the bracket 78 through gearing 82. A disc 84 is fixed to said shaft 80.

Said disc includes a main body 85 and a cap 86 secured thereto by bolts 88. A slide 90 is slidable in a guideway 92 of the body and has a stud 94 on which is fixed a wheel 96 corresponding to wheel 70. An adjusting screw 98 in threaded engagement with the cap 86 and slide 90 in its rotation moves the slide in one direction or the other. The slide is adjusted so that the stud 94 has the same relationship to the axis of shaft 80 that a throw of the crank shaft has to the main bearing. That is, the stud 94 is adjustable relative to shaft 80 so as to obtain an offset or throw corresponding to the relationship of the main bearing and throw to be ground.

An endless band or belt 100 is in engagement with the wheels 70 and 96 and said band will have non-stretchable characteristics and may be a band of steel.

With the pulley 70 on a main bearing 4 of the crank shaft and motor 76 in operation, the disc 84 is rotated to revolve wheel 96 about axis of shaft 80 whereby through the belt 100 and wheel 70 the main bearing is rotated about the axis of the throw. The mechanism is so constructed and arranged that the crank shaft is not only rotated on the axis of the throw but forces are applied to the shaft for cancelling out such downward deflections as there may be. And the apparatus may be adjusted or made to eliminate such deflection and will locate the throw accurately on the axis of rotation.

As in the former case, it may be desirable, depending upon conditions, to employ more than one of the devices just described.

From the foregoing it will be observed that deflection may be cancelled where the shaft on a machine is rotated by means associated with the machine or a shaft may be rotated and deflection simultaneously cancelled.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Apparatus for cancelling downward deflection of a horizontally disposed crank shaft relative to an overhead support in rotation of the shaft supported for rotation on the axis of a certain throw thereof which is offset radially a predetermined distance relative to the axis of an intermediate main bearing of said shaft comprising, a lower wheel having adjustable securing means securing said wheel to said intermediate main bearing of the crank shaft with the axis of the wheel coinciding with the axis of rotation of said certain throw, a cylinder carried by said support above said crank shaft having a piston therein provided with a depending rod, an upper wheel rotatably mounted on said rod and an endless relatively non-stretchable band around said wheels, and pressure means for applying pressure to said cylinder and piston whereby to apply upward forces to said shaft to overcome a downward deflecting tendency thereof.

2. Apparatus set forth in claim 2 wherein said adjustable securing means includes separate clamps slidably and adjustably guided in said lower wheel having adjacent bearing gripping faces and adjusting screw means connecting said wheel and clamps.

3. Apparatus for rotating a horizontally disposed crank shaft supported for rotation on the axis of a throw thereof which is offset from an intermediate main bearing of said shaft and for resisting downward deflection of said shaft relative to a support thereabove comprising, a support bracket fixed to a support above said crank shaft having a drive shaft rotatable relative thereto on an axis parallel to the axis of said throw, means to rotate said shaft, a disc fixed on said drive shaft, a driven wheel secured on said main bearing of said crank shaft, a drive wheel, adjustable mounting means between said drive wheel and disc for positioning the axis of said drive wheel relative to the axis of said drive shaft in an offset relation to agree with the offset of the throw relative to the intermediate main bearing of said crank shaft, and an endless non-stretchable belt around said wheels arranged whereby as said drive shaft is rotated said crank shaft is rotated on the axis of said throw and the tendency of downward deflection thereof is resisted.

4. Apparatus as set forth in claim 3 wherein said mounted means includes a stud on which said drive wheel is mounted that is fixed to a slide adjustable and slidable relative to said disc and radially of the said drive shaft, and screw means between said drive disc and slide securing said slide in adjusted positions.

References Cited in the file of this patent

UNITED STATES PATENTS

| | | |
|---|---|---|
| 1,141,539 | Greer | June 1, 1915 |
| 1,488,990 | Lechenaux | Apr. 1, 1924 |
| 1,575,307 | Bachmann | Mar. 2, 1926 |
| 1,581,091 | Stewart | Apr. 13, 1926 |
| 2,458,255 | Couse | Jan. 4, 1949 |

OTHER REFERENCES

Publication: American Machinist Magazine, March 17, 1904, page 358.